(12) United States Patent
Brunou

(10) Patent No.: US 11,559,814 B2
(45) Date of Patent: Jan. 24, 2023

(54) DOUBLE ACTING DEMOLITION DEVICE AND UTILITY MACHINE FOR DEMOLISHING STRUCTURES

(71) Applicant: Savonlinnan PR-Urakointi Oy, Savonlinna (FI)

(72) Inventor: Jarkko Brunou, Savonlinna (FI)

(73) Assignee: SAVONLINNAN PR-URAKOINTI OY, Savonlinna (FI)

( * ) Notice: Subject to any disclaimer, the term of this patent is extended or adjusted under 35 U.S.C. 154(b) by 46 days.

(21) Appl. No.: 16/489,006

(22) PCT Filed: Feb. 26, 2018

(86) PCT No.: PCT/FI2018/050139
§ 371 (c)(1),
(2) Date: Aug. 27, 2019

(87) PCT Pub. No.: WO2018/158500
PCT Pub. Date: Sep. 7, 2018

(65) Prior Publication Data
US 2020/0023371 A1    Jan. 23, 2020

(30) Foreign Application Priority Data

Feb. 28, 2017  (FI) ..................................... 20175185

(51) Int. Cl.
*B02C 1/10*       (2006.01)
*B23D 35/00*   (2006.01)
(Continued)

(52) U.S. Cl.
CPC ................ *B02C 1/10* (2013.01); *B02C 1/005* (2013.01); *B23D 17/00* (2013.01); *B23D 35/008* (2013.01); *E02F 3/965* (2013.01); *E02F 9/2271* (2013.01); *E04G 23/082* (2013.01); *B02C 2201/02* (2013.01)

(58) Field of Classification Search
CPC ....... E02F 3/965; E02F 9/2271; E02F 3/3681; B23D 17/00; B23D 35/008; B23D 31/008;
(Continued)

(56) References Cited

U.S. PATENT DOCUMENTS 4,951,886 A    8/1990  Berto
5,438,772 A *  8/1995  Mieger .................. B23D 17/00
                                                                37/406
(Continued)

FOREIGN PATENT DOCUMENTS

CA    2177896 A1 * 12/1997
DE    9210292 U1    10/1992
(Continued)

OTHER PUBLICATIONS

Finnish Patent and Registration Office, Search report for FI20175185, dated Sep. 26, 2019, 1 page.

*Primary Examiner* — Jonathan G Riley
(74) *Attorney, Agent, or Firm* — Thomas | Horstemeyer, LLP

(57) ABSTRACT

The application relates to a double acting demolition device according to one embodiment for demolishing structures. The device includes a first crushing jaw for crushing operation, a first cutting jaw for cutting operation, and a combination jaw. The first jaws are separate jaws. The combination jaw is attachable to the first cutting jaw for constructing a second crushing jaw and to the first crushing jaw for constructing a second cutting jaw. The second crushing jaw is used jointly with the first crushing jaw in crushing operation and the second cutting jaw is used jointly with the first cutting jaw in cutting operation. In crushing operation, the first crushing jaw rotates around a fulcrum other than that of the second cutting jaw in cutting operation.

10 Claims, 2 Drawing Sheets

(51) Int. Cl.
*E02F 3/96* (2006.01)
*E04G 23/08* (2006.01)
*B02C 1/00* (2006.01)
*B23D 17/00* (2006.01)
*E02F 9/22* (2006.01)

(58) Field of Classification Search
CPC ....... B02C 1/10; B02C 1/005; B02C 2201/02; E04G 23/082; E04G 23/08; E04G 2023/086; Y10T 225/22; Y10T 225/371
See application file for complete search history.

(56) References Cited

U.S. PATENT DOCUMENTS 5,704,560 A * 1/1998 Wimmer ................. E02F 3/965
241/101.73

| | | | | |
|---|---|---|---|---|
| 2012/0000192 | A1 * | 1/2012 | Ramun | .................... E02F 3/966 60/427 |
| 2017/0022684 | A1 | 1/2017 | Simpson | |
| 2019/0283033 | A1 * | 9/2019 | Brunou | ................ B23D 35/002 |

FOREIGN PATENT DOCUMENTS

| | | | | |
|---|---|---|---|---|
| EP | 362098 | A * | 4/1990 | ............ E02F 3/3681 |
| EP | 0362098 | A1 | 4/1990 | |
| FI | 125691 | B | 1/2016 | |
| JP | S557351 | A | 1/1980 | |
| JP | H04153469 | * | 5/1992 | |
| JP | H04153469 | A | 5/1992 | |
| JP | 2000312831 | A * | 11/2000 | ............. E02F 3/965 |
| JP | 2006042659 | A * | 2/2006 | |
| JP | 2007009679 | A * | 1/2007 | |
| JP | 2011217694 | A * | 11/2011 | |

* cited by examiner

US 11,559,814 B2

DOUBLE ACTING DEMOLITION DEVICE AND UTILITY MACHINE FOR DEMOLISHING STRUCTURES

PRIORITY

This application is a U.S. national application of the international application number PCT/FI2018/050139 filed on Feb. 26, 2018 and claiming priority of Finnish national application 20175185 filed on Feb. 28, 2017 the contents of all of which are incorporated herein by reference.

TECHNICAL FIELD

The application is directed generally to a double acting demolition device and a utility work machine for demolishing structures.

BACKGROUND

Concrete structures have generally steel rebars embedded in concrete and special tools are required for the demolition thereof.

FIG. 0a shows a pair of concrete shears 000 mountable on an excavator and intended for crushing and pulverizing concrete structures.

The shears 000 include a frame 001, a jaw 004 movable in rotary motion relative to a shaft 002, and a second jaw 005 made up by the frame 001. Each jaw 004, 005 is provided successively with teeth 006, 007 intended for crushing concrete and with blades 010, 011 intended for cutting metal. The jaw 004 is pressed against the jaw 005 by means of a cylinder 028.

Concrete is crushed with tips of the jaws 004, 005 and metal is sheared with the blades 010, 011 present at the base thereof.

It is important in concrete crushing to provide a maximum crushing force with the jaws 004, 005 fully open, thus enabling a placement of the largest possible object between the jaws. Conventionally, the jaws 004, 005 are provided with a maximum crushing force when an angle of 90° is established by the cylinder 028 operating the jaw 004 as well as by a line between fulcrums 021 and 002. Generally, the cylinder 028 and the fulcrum 021 of the shears 000 are located in such a way that the maximum crushing force occurs when the jaws 004, 005 are fully or almost fully open.

It is unavoidable that some concrete intended for crushing finds its way between the metal blades 010, 011, whereby the blades 010, 011 become dull and need replacement.

In addition, the successive teeth and blades 006, 007, 010, 011 of the shears 000 are inconvenient in terms of cutting large metal profiles as the bringing thereof into a coverage range of the short metal blades 010, 011 is difficult even if the cutting force were sufficient for shearing the profile.

With a change of material to be treated, the end of an excavator boom must be refitted with an implement suitable for working the new material.

FIG. 0b shows a pair of shears 070 intended for cutting metal structures.

The shears 070 include a frame 071, a metal jaw 074 movable in rotary motion relative to a shaft 072, and a second metal jaw 075 made up by the frame 071. The jaw 074 is pressed against the jaw 075 by means of a cylinder 078.

The maximum cutting force of the jaws 074, 075 is timed to occur at a point when the cylinder 078, as well as a straight line drawn between its connecting point 079 and the shaft 072, are perpendicular to each other at a final stage of the cutting motion.

Depending on the situation, the time required for an implement replacement process is from tens of minutes to a few hours. The replacement process to be performed several times a day hinders the fluency of demolition work as well as impairs considerably its productivity.

SUMMARY

One objective of the invention is to eliminate some of the problems in available implements mountable on a utility work machine and intended for demolishing structures.

One objective of the invention is attained with a demolition device and a utility work machine according to the respective independent claims.

A double acting demolition device according to one embodiment for demolishing structures comprises a first crushing jaw for crushing operation, a first cutting jaw for cutting operation, and a combination jaw. The first jaws are separate jaws. The combination jaw is attachable to the first cutting jaw for constructing a second crushing jaw and to the first crushing jaw for constructing a second cutting jaw. The second crushing jaw is used jointly (together) with the first crushing jaw in crushing operation and the second cutting jaw is used jointly (together) with the first cutting jaw in cutting operation. In crushing operation, the first crushing jaw rotates around a fulcrum other than that of the second cutting jaw in cutting operation.

In a utility work machine according to one embodiment, thereon is mounted a double acting demolition device for demolishing structures. The device comprises a first crushing jaw for crushing operation, a first cutting jaw for cutting operation, and a combination jaw. The first jaws are separate jaws. The combination jaw is attachable to the first cutting jaw for constructing a second crushing jaw and to the first crushing jaw for constructing a second cutting jaw. The second crushing jaw is used jointly with the first crushing jaw in crushing operation and the second cutting jaw is used jointly with the first cutting jaw in cutting operation. In crushing operation, the first crushing jaw rotates around a fulcrum other than that of the second cutting jaw in cutting operation.

Other embodiments are presented in the dependent claims.

BRIEF DESCRIPTION OF THE FIGURES

Embodiments of the invention will be presented with reference to the accompanying figures:

FIGS. 0a-0b show prior art solutions

DETAILED DESCRIPTION OF THE FIGURES

Figure 1A:
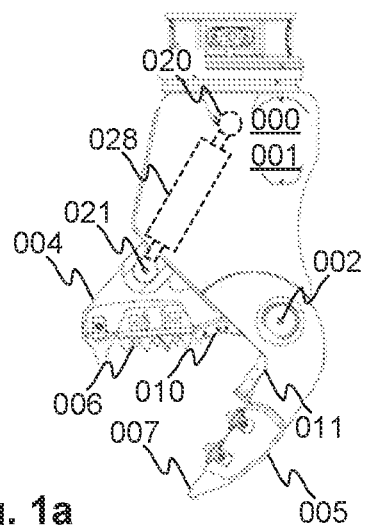
FIG. 1 shows a demolition device
Figure 1B:
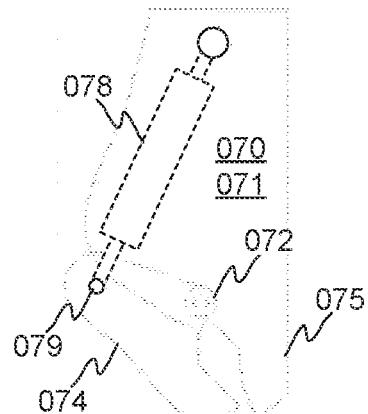
Figure 1C:
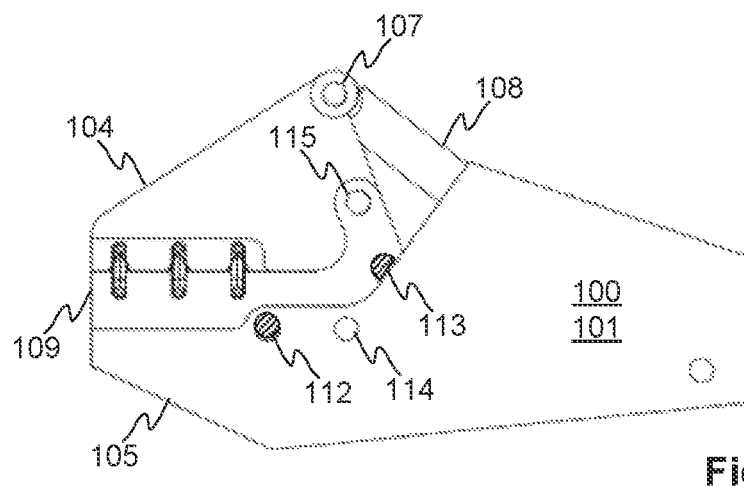

FIG. 1 shows a double acting variable-geometry demolition device (gripper, pair of shears) 100 for breaking up structures and/or blocks of material.

The device 100 includes a frame 101, a first crushing jaw 104 for crushing operation, a first cutting jaw 105 made up by the frame 101 for cutting operation, and a combination jaw 109.

The device 100 can use its crushing operation for crushing at least one of the following: concrete, aggregate, wood, glass, manufactured wood products or manufactured stone products.

The device 100 can use its cutting operation for cutting at least one of the following: metal, wood, manufactured wood products or plastic.

The jaws 104, 105, 109 are separate jaws.

The device 100 can be further provided with a cylinder (cylinder means) 108 attached to the frame 101 and to the crushing jaw 104 and enabling a displacement of the crushing jaw 104.

The cylinder 108 is attached by its first end to the frame 101 (to an attachment point 220 shown in FIGS. 2b and 3b), and articulated by its second end at a fulcrum 107 to the crushing jaw 104 so as to enable a movement of the crushing jaw 104 by means of the cylinder 108.

The crushing jaw 104 can be provided with a pivot aperture 113, whereby an articulation to be constructed therein enables the crushing jaw 104 to perform by means of the cylinder 108 a rotational movement R relative to the articulation.

In addition, the crushing jaw 104 can be provided with a pivot aperture (attachment aperture) 115, whereby an attachment 315 to be constructed therein enables such an attachment of the combination jaw 109 that the device 100 is applicable for cutting operation.

The cutting jaw 105 can be provided with a pivot aperture 112, whereby an articulation to be constructed therein enables the crushing jaw 104 and the combination jaw 109, secured to the former by means of the attachment 315, to perform by means of the cylinder 108 a rotational movement R relative to the articulation.

In addition, the cutting jaw 105 can be provided with a pivot aperture (attachment aperture) 114, whereby an attachment 214 to be constructed therein enables such an attachment of the combination jaw 109 that the device 100 is applicable for crushing operation.

The combination jaw 109 can be provided with respective pivot apertures 112, 114, 113, 115, which enable construction of the above-described articulations and attachments (fulcrums) 214, 315.

The combination jaw 109 is articulated fixedly to the crushing jaw 104 at the apertures 113 present therein by means of a pin attachment so as to construct a first fulcrum 113.

In addition, the combination jaw 109 is articulated fixedly to the cutting jaw 105 at the apertures 112 present therein by means of a pin attachment so as to construct a second fulcrum 112.

The fulcrums (apertures) 112, 113 are separate fulcrums located in different parts of the device 100.

The device 100 can be further provided with attachment means for its mechanical attachment to a utility work machine in a removable manner.

In addition, the device 100 can be provided with coupling means for its coupling to the control system of a utility work machine.

Figure 2A:
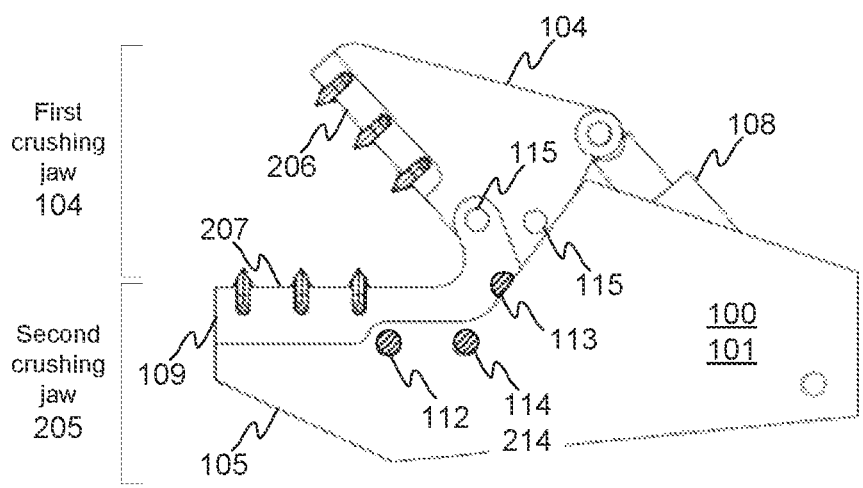
FIG. 2a-2b show a combination tool mounting for crushing operation
Figure 2B:
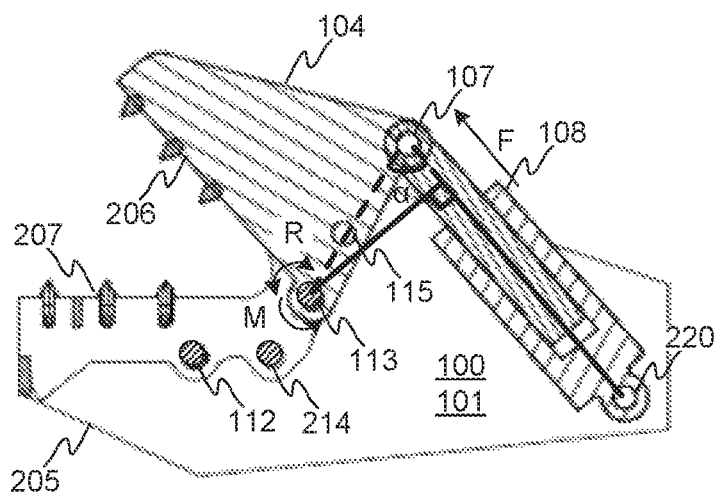

FIGS. 2a-2b show the device 100 and its cross-section with the combination tool 109 fixed for crushing operation, i.e. for crushing a structure (in a crushing position).

The crushing jaw 104 is provided with a crushing tool 206, which enables its use for breaking up structures.

The combination jaw 109 is provided at one edge thereof with a crushing tool 207, enabling its use for breaking up structures jointly with the crushing tool 206.

The combination jaw 109 is attached to the cutting jaw 105 for constructing a second crushing jaw 205 at apertures 114 present therein in a detachable manner by means of a pin attachment for providing a first attachment point (fulcrum) 214 while the apertures 115 of the jaws 104, 109 are vacant, i.e. without attachment.

The combination jaw 109 is attached (articulated) with a pin attachment to the cutting jaw 105 at the pivot apertures 112, 114 so as to retain the same together in crushing operation.

The obtained crushing jaw 205 is operated jointly with the movable crushing jaw 104 in crushing operation in such a way that the crushing jaw 104 is pressed by means of the cylinder 108 against the fixed crushing jaw 205, the former performing a rotational movement R around the fulcrum 113 resulting in a closure of the jaws 104, 205.

The jaws 104, 205 are opened, i.e. the compression is released, by means of the cylinder 108 by performing a rotational movement R around the fulcrum 113 in an opposite direction.

A moment M resulting from a force F generated by the cylinder 108 attains its maximum value when an angle $\alpha$ of 90° is formed between the cylinder 108, i.e. between a line established by its attachment point 220 and the fulcrum 107 and a line established by the fulcrum 107 and the crushing jaw 104.

In the process of crushing a chunky piece of material, e.g. a block of concrete, the maximum force, i.e. the 90° point of maximum force, is required immediately when the jaws 104, 205 are fully or almost fully open and when a closing movement is commenced thereby, because concrete has a high compressive strength which is proportional to the size of the block.

FIG. 2b illustrates how a maximum force of the device 100 is attained in crushing operation while the jaws 104, 205 are fully or almost fully open. In the figure, the crushing jaw 104 pushed by the cylinder 108 has already been pressed beyond the 90° point of maximum force in rotational movement R towards the crushing jaw 205 in such a way that the angle $\alpha$ between the cylinder 108 and a line established by the fulcrums 107, 113 is less than 90°.

Figure 3A:
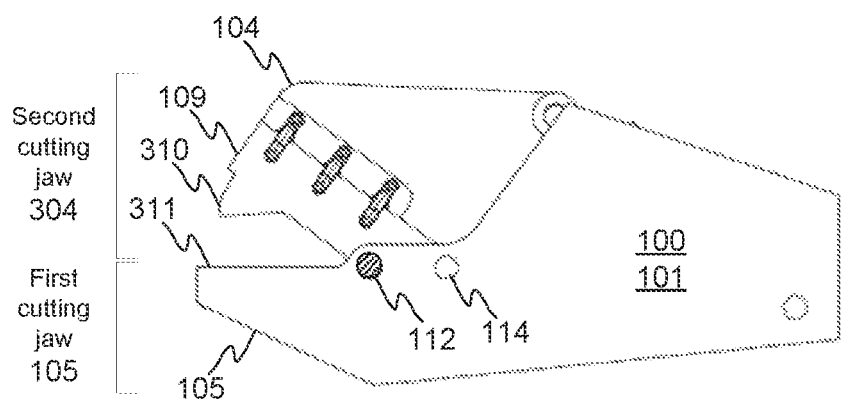
FIG. 3a-3b show a combination tool mounting for cutting operation
Figure 3B:
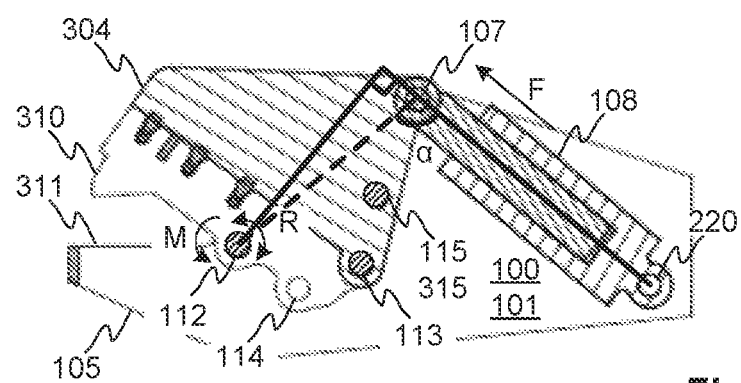

FIGS. 3a-3b show the device 100 and its cross-section with the combination tool 109 fixed for cutting operation, i.e. for cutting a structure (in a cutting position)

The cutting jaw 105 is provided with a cutting tool 311, which enables its use for shearing structures.

The combination tool 109 is provided not only with the crushing tool 207 but also with a cutting tool 310 at one edge thereof, enabling its use for shearing structures jointly with the cutting tool 311.

The combination jaw 109 is attached to the crushing jaw 104 for constructing a second cutting jaw 304 at apertures 115 present therein in a detachable manner by means of a pin attachment for providing a second attachment point (fulcrum) 315 while the apertures 114 of the jaws 105, 109 are vacant, i.e. without attachment.

The combination jaw 109 is attached (articulated) with a pin attachment to the crushing jaw 104 at the pivot apertures 113, 115 so as to retain the same together in cutting operation.

It is by virtue of the attachments 214, 315 constructed in the pivot apertures 114, 115 that the device 100 changes its geometry in various operations: in crushing operation, the crushing jaw 104 rotates around the fulcrum 113 as presented above, but in cutting operation, on the other hand, the cutting jaw 304 rotates around a different fulcrum 112.

The constructed movable cutting jaw 304 is used jointly with the cutting jaw 105 in cutting operation in such a way that the cutting jaw 304 is pressed by means of the cylinder 108 against the fixed cutting jaw 105, whereby the former performs a rotational movement R around the fulcrum 112 resulting in a closure of the jaws 105, 304.

The jaws 105, 304 are opened by means of the cylinder 108 by performing a rotational movement R around the fulcrum 112 in an opposite direction.

As in crushing operation, it is also in cutting operation that the moment M resulting from a force F generated by the cylinder 108 attains its maximum value when an angle α of 90° is formed between a line established by the cylinder 108 and a line established by the fulcrum 107 and the fulcrum 112 of the cutting jaw 304.

It is in the process of mechanically cutting metal that various structural sections, such as an I- or H-beam, change shape prior to being severed, which is why the maximum force, i.e. the 90° point of maximum force, is not needed until the jaws 105, 304 are almost closed. Thus, as for its geometry, the device 100 is designed in such a way that, in cutting operation, the maximum force is available with the jaws 105, 304 almost closed as opposed to the crushing operation of the device 100 in which the maximum force is attained with the jaws 104, 205 fully or almost fully open.

Changing the device 100 in terms of its geometry such that the point of maximum force for the jaws 104, 105, 205, 304 varies between crushing and cutting operations is achieved by changing (swapping) the attachment 214, 315 in the apertures 114, 115, whereby in crushing operation the crushing jaw 104 rotates around the fixed fulcrum 113, and in cutting operation the cutting jaw 304 rotates around the fixed fulcrum 112.

FIG. 3b shows how a maximum force of the device 100 is attained in cutting operation while the jaws 105, 304 are almost fully pressed together. In the figure, the crushing jaw 304 pushed by the cylinder 108 has not yet been pressed to a 90° point of maximum force but, instead, the angle α between the cylinder 108 and a line established by the fulcrums 107, 113 is more than 90°. As the cylinder 108 continues to push forward, the crushing jaw 304 rotates in the direction of a rotational movement R around the fulcrum 113 in such a way that the point of maximum force is attained with the jaws 105, 304 almost in contact with each other.

FIGS. 2b and 3b show how the point of maximum force in crushing operation, i.e. when the angle α between a line established by the cylinder 108 and a line established by the fulcrums 107, 113 is 90°, shown in FIG. 2b, and the point of maximum force in cutting operation, i.e. when the angle α between a line established by the cylinder 108 and a line established by the fulcrums 107, 112 is 90°, shown in FIG. 3b, are developed at different working stages of the cylinder 108. In crushing operation the point of maximum force is attained in an early part of the cylinder's 108 working cycle, and in cutting operation, on the other hand, in a latter part of the working cycle by virtue of the device 100 having a variable geometry.

The device 100 integrates two functions in one device in such a way that the requirements of both intended functions become well observed.

The utility work machine, to which the device 100 is mountable in a removable manner, can be an excavator which may be a revolving excavator, backhoe loader or mini excavator mounted on a wheeled or tracked undercarriage.

The utility work machine may include a boom having its end provided with attachment means and control coupling means, the device 100 being removably attachable thereto by using attachment means and coupling means included in its frame 101.

The coupling means included in a utility work machine and in the device 100 enable the device 100 to be connected e.g. to an electric or hydraulic control system of the utility work machine so as to enable the device 100 and operation of the cylinder 108 to be controlled from the utility work machine.

The attached and coupled device 100 is able to swivel and rotate at the end of a utility work machine's boom, and it can be controlled to perform e.g. compression and opening actions of the jaws 104, 105, 205, 304.

The invention claimed is:

1. A double acting demolition device for demolishing structures, comprising
a first crushing jaw for crushing operation,
a first cutting jaw for cutting operation, and
a combination jaw,
wherein the first crushing and cutting jaws are separate jaws,
wherein the combination jaw is configured to be attached to the first cutting jaw for establishing a second crushing jaw and to the first crushing jaw for establishing a second cutting jaw,
wherein the second crushing jaw is configured to be used jointly with the first crushing jaw in the crushing operation and the second cutting jaw is configured to be used jointly with the first cutting jaw in the cutting operation,
wherein said first crushing jaw comprises a cutting pivot aperture for attaching the combination jaw to the first crushing jaw and said first cutting jaw comprises a crushing pivot aperture for attaching the combination jaw to the first cutting jaw, and
wherein attachments of the cutting and crushing pivot apertures of the first crushing and cutting jaws are configured to enable the first crushing jaw to rotate alone around a first fulcrum and to rotate as a part of the second cutting jaw around a second fulcrum, which is a different fulcrum than the first fulcrum, in such a way that the first and second crushing jaws are configured to attain a maximum attainable force in the crushing operation at an opening angle between the first and second crushing jaws, which is greater than an opening angle between the first and second cutting jaws where the first and second cutting jaws are configured to attain a maximum attainable force in the cutting operation.

2. The device according to claim 1, wherein the first crushing jaw is configured to press against the second crushing jaw by virtue of a rotational movement (R) occurring around the first fulcrum and the second cutting jaw is configured to press against the first cutting jaw by virtue of a rotational movement (R) occurring around the second fulcrum.

3. The device according to claim 1, wherein the combination jaw is fixedly pivoted at the first fulcrum to the first crushing jaw and at the second fulcrum to the first cutting jaw.

4. The device according to claim 1, wherein the combination jaw is provided with a corresponding crushing pivot aperture for removably attaching the combination jaw to the first cutting jaw with a pin attachment belonging to said attachments.

5. The device according to claim 1, wherein the combination jaw is provided with a corresponding cutting pivot aperture for removably attaching the combination jaw to the first crushing jaw with a pin attachment belonging to said attachments.

6. The device according to claim 4, wherein, when the pin attachment is in the corresponding crushing pivot aperture, a corresponding cutting pivot aperture is released from attachment, and when the pin attachment is in the corresponding cutting pivot aperture, the corresponding crushing pivot aperture is released from attachment.

7. The device according to claim 1, wherein the first crushing jaw or the second cutting jaw is configured to rotate relative to the fixed first cutting jaw.

8. The device according to claim 1, which further comprises a cylinder for rotating the first crushing jaw around the first fulcrum and for rotating the second cutting jaw around the second fulcrum.

9. A utility work machine, which is fitted with the double acting demolition device according to claim 1 for demolishing structures.

10. The device according to claim 1, wherein the first cutting jaw is configured for removable attachment to a utility work machine.

\* \* \* \* \*